United States Patent [19]

Keogh et al.

[11] Patent Number: 5,262,467
[45] Date of Patent: Nov. 16, 1993

[54] FLAME RETARDANT COMPOSITIONS

[75] Inventors: Michael J. Keogh, Bridgewater; Jinder Jow, Branchburg, both of N.J.

[73] Assignee: Union Carbide Chemicals & Plastics Technology Corporation, Danbury, Conn.

[21] Appl. No.: 975,007

[22] Filed: Nov. 12, 1992

[51] Int. Cl.$^5$ ................................................ C08K 3/22
[52] U.S. Cl. .................................. 524/436; 174/110 R
[58] Field of Search ........................ 524/436; 174/110; 525/78

[56] References Cited

U.S. PATENT DOCUMENTS

| | | | |
|---|---|---|---|
| 4,387,188 | 6/1983 | Statz | 525/78 |
| 4,612,155 | 9/1986 | Wong et al. | 525/78 |
| 4,698,379 | 10/1987 | Nakaya et al. | 523/513 |
| 4,722,858 | 2/1988 | Harbourne et al. | 428/220 |
| 4,801,639 | 1/1989 | Hoshi et al. | 524/112 |
| 4,845,146 | 7/1989 | Inoue et al. | 524/436 |
| 4,847,317 | 7/1989 | Dokurno et al. | 524/424 |
| 4,983,742 | 1/1991 | Yusawa et al. | 524/436 |
| 5,021,501 | 6/1991 | Vroomans | 525/78 |
| 5,155,159 | 10/1992 | Ohmae et al. | 524/436 |
| 5,211,746 | 5/1993 | Keogh et al. | 524/436 |

*Primary Examiner*—Veronica P. Hoke
*Attorney, Agent, or Firm*—Saul R. Bresch

[57] ABSTRACT

A composition comprising:
(a) polyethylene having a density equal to or less than 0.915 gram per cubic centimeter grafted with an unsaturated aliphatic diacid anhydride; and
(b) magnesium hydroxide, the surface of which is untreated.

12 Claims, No Drawings

FLAME RETARDANT COMPOSITIONS

TECHNICAL FIELD

This invention relates to flame retardant compositions containing an ethylene copolymer and a magnesium hydroxide filler. The compositions are useful in the insulation and jacketing of electrical conductors and communications media such as fiber optics cable.

BACKGROUND INFORMATION

Wire and cable, whether used for the transmission of power or communications, are usually stored outside or in unheated areas before installation. If the insulation or jacketing becomes brittle at low temperatures and cracks, the integrity of the wire or cable is defeated and a short circuit with its attendant problems becomes a real possibility. Consequently, the specifications for the insulating or jacketing layers generally require that these materials pass a low temperature brittleness test. Low temperature performance of minus 50° C. or higher is often cited by wire and cable manufacturers as desirable, particularly for installations in, for example, Canada.

A typical power cable is constructed of metal conductors insulated with a polymeric material. These elements are generally twisted to form a core and are protected by another polymeric sheath or jacket material. In certain cases, added protection is afforded by inserting a wrap between the core and the sheath.

Flame retardant compositions comprising polyethylene and magnesium hydroxide are useful in wire and cable applications, the polyethylene providing flexibility and the magnesium hydroxide, flame retardance. Unfortunately, these compositions do not come close to meeting the most desirable low temperature performance as far as brittleness is concerned. It is difficult, for example, to achieve a low temperature brittleness of 0° C. with a linear low density polyethylene flame retardant composition, let alone the desirable minus 50° C.

DISCLOSURE OF THE INVENTION

An object of this invention, therefore, is to provide a flame retardant composition, which has outstanding low temperature brittleness resistance, thus being useful in the coldest of climes. Other objects and advantages will become apparent hereinafter.

According to the present invention the above object is met by a composition comprising:

(a) polyethylene having a density equal to or less than 0.915 gram per cubic centimeter grafted with an unsaturated aliphatic diacid anhydride; and (b) magnesium hydroxide, the surface of which is untreated.

DESCRIPTION OF THE PREFERRED EMBODIMENT(S)

The polyethylene is a very low density polyethylene (VLDPE). The VLDPE is a copolymer of ethylene and at least one alpha-olefin having 3 to 12 carbon atoms and preferably 3 to 8 carbon atoms. The density of the copolymer is equal to or less than 0.915 gram per cubic centimeter and is preferably no lower than 0.860 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. The catalysts and the processes for making the VLDPE are described, respectively, in U.S. Pat. Nos. 4,101,445 and 4,302,565 and European patent application 0 120 501 published on October 3, 1984.

The melt index of the VLDPE can be in the range of about 0.1 to about 50 grams per 10 minutes and is preferably in the range of about 0.4 to about 10 grams per 10 minutes. The melt index is determined in accordance with ASTM D-1238, Condition E, measured at 190° C. Suitable alpha-olefin comonomers are exemplified by propylene, 1-butene, 1-hexene, 4-methyl-1-pentene, and 1-octene. The portion of the VLDPE attributed to the comonomer(s), other than ethylene, is in the range of about 1 to about 49 percent by weight based on the weight of the copolymer and is preferably in the range of about 10 to about 40 percent by weight.

Anhydrides of unsaturated aliphatic diacids are commonly grafted to various polyolefins. These anhydrides can have 4 to 20 carbon atoms and preferably have 4 to 10 carbon atoms. Examples of anhydrides, which are useful in this invention, are maleic anhydride, itaconic anhydride, and nadic anhydride. The preferred anhydride is maleic anhydride. Excess anhydride, if present after grafting, can be removed by devolatilization at temperatures in the range of about 200° C. to about 250° C.

The grafting is accomplished by using an organic peroxide catalyst, i.e., a free radical generator, such as dicumyl peroxide; lauroyl peroxide: benzoyl peroxide; tertiary butyl perbenzoate: di(tertiary-butyl) peroxide; cumene hydroperoxide; 2,5-dimethyl-2,5-di(t-butylperoxy)hexyne-3; 2,5-dimethyl-2,5-di(t-butylperoxy)hexane; tertiary butyl hydroperoxide; isopropyl percarbonate; and alpha,alpha'-bis(tertiarybutylperoxy)diisopropylbenzene. The organic peroxide catalyst may be added together with the anhydride.

Grafting temperatures can be in the range of about 100° to about 300° C. and are preferably in the range of abut 150° to about 200° C.

A typical procedure for grafting maleic anhydride onto polyethylene is described in U.S. Pat. No. 4,506,056.

Grafting can also be accomplished by adding a solution of anhydride, an organic peroxide catalyst, and an organic solvent to polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products.

The anhydride solution can contain abut 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride grafted polyethylene can contain about 0.05 to about 5 parts by weight of anhydride per 100 parts by weight of polyethylene and preferably contains about 0.1 to about 2 parts by weight of anhydride per 100 parts by weight of polyethylene.

The VLDPE can also be grafted with an unsaturated monomeric silane having one or more hydrolyzable groups in order to make the polymer hydrolyzable thus permitting moisture cure. While such grafting can be accomplished simultaneously with the grafting of the unsaturated aliphatic diacid anhydride, the grafting can also be effected before or after the grafting of the anhydride, if desired.

The silane grafted copolymer can be prepared by the technique described below. In this copolymer, the portion attributed to the silane is present in an amount of about 0.5 percent to about 10 percent by weight based on the weight of the copolymer and is preferably incorporated into the copolymer in an amount of about 0.5 to about 4 percent by weight. Generally speakinq, any unsaturated monomeric silane containinq at least one hydrolyzable group can be used. The silane used to modify the copolymer can be, among others, an alkenyl alkoxy silane such as a vinyl trialkoxy silane exemplified by vinyl trimethoxy silane, vinyl triethoxy silane, or vinyl isopropoxy silane. If slower water cure or better shelf stability are desired, vinyl triisobutoxy silane or vinyl tris(2-ethyl-hexoxy) silane can be used.

The hydrolyzable silane and anhydride grafted polymer can be crosslinked with moisture in the presence of a conventional silanol condensation catalyst such as dibutyl tin dilaurate, dioctyl tin maleate, stannous acetate, stannous octoate, lead naphthenate, zinc octoate, iron 2-ethyl hexoate, and other metal carboxylates. Further acceleration of crosslinking can be accomplished by adding a cocatalyst such as tetramethoxy titanate, tetraisopropyl titanate, tetramethyl titanate, or other organo titanates mentioned in U.S. Pat. No. 4,446,279. The catalysts can be introduced into the composition in conventional amounts, typically about 0.005 to about 1 part by weight of primary catalyst per 100 parts by weight of copolymer and about 0.25 to about 10 parts by weight of cocatalyst Per 100 parts by weight of copolymer.

A typical procedure for preparing a silane grafted polyethylene follows: 100 parts of ethylene/1-butene copolymer having a density of 0.90, 0.2 part of polymerized 1,3-dihydro-2,2,4-trimethylquinoline (an antioxidant), 0.1 part of dicumyl peroxide, and 4 parts of vinyl tri-2-ethyl-hexoxy silane are mixed in a Brabender mixer at a temperature in the range of about 80° C. to about 115° C., a temperature low enough to keep the dicumyl peroxide below its decomposition temperature. After mixing for five minutes, the temperature is raised to a temperature in the range of about 150° C. to about 220° C. The batch is then mixed for 5 to 10 minutes during which grafting of the silane to the copolymer occurs. The antioxidant is used as a radical trap to control the amount of crosslinking. The foregoing technique can be repeated, for example, with 3 parts of vinyltriisobutyoxysilane and 0.1 part of the antioxidant, tetrakis[methylene(3-5-di-tert-butyl-4-hydroxyhydro-cinnamate)]methane; initial mixing is in the range of 110° C. to 120° C.; grafting is for five minutes at 185° C.

Various processes for preparing silane grafted polymers and numerous unsaturated silanes suitable for use in preparing these polymers and bearing hydrolyzable groups such as alkoxy, oxyaryl, oxyaliphatic, and halogen are mentioned in U.S. Pat. Nos. 3,075,948; 3,225,018; 4,412,042; 4,413,066; 4,574,133; and 4,593,071.

It will be noted that the same organic peroxide catalyst is used in silane grafting as in anhydride grafting.

The magnesium hydroxide is one conventionally used in wire and cable applications except that it is not surface treated. This means that the surface of the magnesium hydroxide is not treated or coated with a chemical no matter whether the chemical will react with the surface or not, nor are the usual surface treating agents such as carboxylic acids or salts thereof used in the composition into which the magnesium hydroxide is introduced. It will be understood by those skilled in the art that once the magnesium hydroxide is mixed into the cable composition, it will then be coated with the mixture of resin and other additives.

A preferred magnesium hydroxide has the following characteristics: (a) a strain in the <101> direction of no more than $3.0 \times 10^{-3}$; (b) a crystallite size in the <101> direction of more than 800 angstroms; and (c) a surface area, determined by the BET method, of less than 20 square meters per gram. The preferred magnesium hydroxide and a method for its preparation are disclosed in U.S. Pat. No. 4,098,762. A preferred characteristic of the magnesium hydroxide is that the surface area, as determined by the BET method, is less than 10 square meters per gram.

The amount of magnesium hydroxide used in the composition can be in the range of about 100 to about 1200 parts by weight of magnesium hydroxide per one hundred parts by weight of anhydride grafted polyethylene and is preferably in the range of about 100 to about 180 parts by weight of magnesium hydroxide per one hundred parts by weight of anhydride grafted polyethylene, about 120 to about 160 parts being the optimum.

Unmodified polyethylenes including VLDPE, linear low density polyethylenes, and other unmodified polyethylenes of varying densities up to 0.965 gram per cubic centimeter can be introduced into the composition of the invention, if desired, with some sacrifice in low temperature brittleness as the amount of unmodified polyethylene increases. Based on 100 parts by weight of modified polyethylene, the unmodified polyethylene can be introduced in a range of about 0 to about 750 parts by weight, preferably no more than about 325 parts by weight, but the closer to zero unmodified polyethylene, the better.

Various conventional additives can be added in conventional amounts to the composition of the invention. Typical additives are antioxidants, ultraviolet absorbers, antistatic agents, pigments, dyes, other fillers including carbon black and aluminum silicate, slip agents, fire retardants, stabilizers, crosslinking agents, halogen scavengers, smoke inhibitors, crosslinking boosters, processing aids, lubricants, plasticizers, and viscosity control agents.

Patents and other publications mentioned in this specification are incorporated by reference herein.

The invention is illustrated by the following examples.

EXAMPLES 1 to 4

Polyethylene I is an unmodified linear low density polyethylene which is a copolymer of ethylene and 1-hexene having a density of 0.917 gram per cubic centimeter and a melt index of 3.4 grams per 10 minutes.

Polyethylene II is a maleinized VLDPE, which is a copolymer of ethylene and 1-butene having a density of 0.900 gram per cubic centimeter and a melt index of 0.4 grams per 10 minutes. The VLDPE is grafted with 0.3 part by weight maleic anhydride per 100 parts by weight of VLDPE according to the procedure mentioned above.

The magnesium hydroxide used in the examples falls within the definition of the preferred magnesium hydroxide mentioned above, and is not surface treated.

The antioxidant is tetrakis[methylene(3,5-di-tert-butyl-4-hydroxyhydrocinnamate)]methane.

Four compositions are processed into test specimens as required by the test procedure for low temperature brittleness (LTB), i.e. ASTM D-746-73 and the test procedure is carried out. LTB is reported in degrees Centigrade.

Variables and results are reported in the Table.

TABLE

| EXAMPLE | 1 | 2 | 3 | 4 |
|---|---|---|---|---|
| Formulation (in parts by weight): | | | | |
| Polyethylene I | 100 | 88 | 76 | — |
| Polyethylene II | — | 12 | 24 | 100 |
| Magnesium Hydroxide | 139.4 | 139.4 | 139.4 | 139.4 |
| Antioxidant | 1 | 1 | 1 | 1 |
| Results: | | | | |
| LTB (°C.) | +18 | −12.5 | −31.5 | −45 |

NOTE TO TABLE: Example 4 in which the resin is 100 percent maleinized VLDPE and the magnesium hydroxide is not surface treated results in an LTB of minus 45° C.

We claim:

1. A composition comprised of a mixture of:
   (a) polyethylene having a density equal to or less than 0.915 gram per cubic centimeter grafted with an unsaturated aliphatic diacid anhydride; and
   (b) magensium hydroxide wherein the hydroxyl groups on the surface thereof are essentially unreacted.

2. The composition defined in claim 1 wherein the anhydride is maleic anhydride.

3. The composition defined in claim 1 wherein the polyethylene is additionally grafted with a hydrolyzable unsaturated monomeric silane.

4. The composition defined in claim 1 wherein the magnesium hydroxide has the following characteristics: (a) a strain in the <101> direction of not more than $3.0 \times 10^{-3}$; (b) a crystallite size in the <101> direction of more than 800 angstroms; and (c) a surface area, determined by the BET method, of less than 20 square meters per gram.

5. The composition defined in claim 4 wherein the magnesium hydroxide has a surface area, as determined by the BET method, of less than about 10 square meters per gram.

6. The composition defined in claim 1 wherein the magnesium hydroxide is present in an amount of about 100 to about 1200 parts by weight of magnesium hydroxide per 100 parts by weight of anhydride grafted polyethylene.

7. The composition defined in claim 6 wherein the magnesium hydroxide is present in an amount of about 100 to about 180 parts by weight of magnesium hydroxide per 100 parts by weight of anhydride grafted polyethylene.

8. The composition defined in claim 6 wherein the composition additionally contains polyethylene, which is not grafted with an unsaturated aliphatic diacid anhydride, in an amount of up to about 750 parts by weight based on 100 parts by weight of anhydride grafted polyethylene.

9. The composition defined in claim 1 wherein the anhydride grafted polyethylene contains about 0.05 to about 5 parts by weight of anhydride per 100 parts by weight of polyethylene.

10. A composition comprised of a mixture of
    (a) polyethylene having a density in the range of 0.860 to 0.915 gram per cubic centimeter grafted with maleic anhydride in an amount of about 0.1 to about 2 parts by weight of maleic anhydride per 100 parts by weight of polyethylene; and
    (b) about 100 to about 180 parts by weight of magnesium hydroxide per 100 parts by weight of anhydride grafted polyethylene wherein the magnesium hydroxide has the following characteristics: (i) a strain in the <101> direction of not more than $3.0 \times 10^{-3}$; (ii) a crystallite size in <101> direction of more than 800 angstroms; and (iii) a surface area, determined by the BET method, of less than 10 square meters per gram and the hydroxyl groups on the surface thereof are essentially unreacted.

11. An article of manufacture comprising an electrical conductor or communications medium surrounded by one or more layers of the composition defined in claim 1.

12. An article of manufacture comprising one or more glass fibers surrounded by one or more layers of the composition defined in claim 1.

* * * * *